Aug. 21, 1934.  R. V. PROCTOR ET AL  1,971,200

JOINT

Filed Nov. 18, 1933

INVENTORS
Robert V. Proctor
and
Charles B. Cushwa
by their atty'
Byrnes, Stebbins, Parmelee & Bleak Patented Aug. 21, 1934

1,971,200

UNITED STATES PATENT OFFICE 1,971,200

JOINT

Robert V. Proctor and Charles B. Cushwa, Youngstown, Ohio, assignors to The Commercial Shearing and Stamping Company, Youngstown, Ohio, a corporation of Ohio Application November 18, 1933, Serial No. 698,676

2 Claims. (Cl. 189—36)

This invention relates to joints. Although the invention is applicable generally to the formation of joints between members, it is described herein more particularly as applied to the formation of joints in a conduit which is formed from curved liner plates secured end to end to form a circumferential course, the adjacent courses also being connected to form the length of the conduit. This application is a continuation-in-part of our copending applications Serial No. 592,718, filed February 13, 1932, and Serial No. 664,094, filed April 3, 1933.

Conduits or other structures of the type referred to which are made of liner plates are under compression during their construction due to the weight of the structure itself or because of the external pressure of the earth. If ordinary bolts are used for connecting the liner plates, there is looseness in the joints of the completed structure which is usually lined with cement. When the completed conduit is subjected to internal pressure, such as by turning water into it, the internal pressure causes the plates to move relative to each other, sometimes cracking the cement lining and causing leaks.

The looseness in the joints is eliminated in the present invention by the use of bolts having a swelled shank portion and a reduced threaded portion. The swelled shank portion of the bolt is of such size that it completely fills the bolt holes in the plates, thereby taking up any looseness which would obtain if ordinary bolts were used.

In the accompanying drawing, which illustrates several embodiments of our invention, Figure 1 is a section through a joint illustrating the bolt with the swelled shank and reduced threaded portion, the bolt being held in place by a nut and washer;

Figure 1:
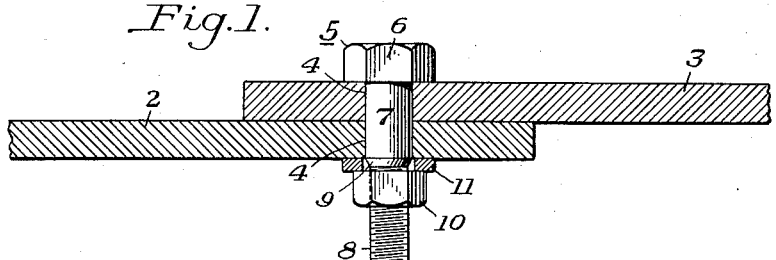

Referring to Figure 1 of the accompanying drawing, reference numerals 2 and 3 designate plates which are to be joined together to form the joint. Each of these plates is provided with a bolt hole 4 in which a bolt indicated generally by the reference numeral 5 fits. The bolt comprises a head 6, a swelled shank portion 7 of a diameter so as to fit tightly in the hole 4, and a reduced threaded portion 8 of smaller diameter than the swelled shank portion. The swelled shank portion 7 is connected by a tapered portion 9 to the reduced threaded portion 8. The bolt is secured in place by a nut 10 and a washer 11. The reduced threaded portion 8 is slightly longer than the combined thicknesses of the plates 2 and 3 so that the washer may be placed in position and the nut screwed onto the bolt when only the reduced threaded portion 8 of the bolt is in the bolt hole. The nut is then screwed further onto the bolt so as to draw the swelled shank portion 7 of the bolt into the bolt hole and cause the swelled shank portion to completely fill the bolt hole. The swelled shank portion of the bolt is of the same size as the bolt hole so that when the bolt is drawn into the position shown in Figure 1, it completely fills the bolt hole, thereby insuring that all looseness is taken up in the joint during assemblage so that there will be no looseness to be taken up when water is turned into the conduit which might cause cracking of the cement lining.

Figure 2:
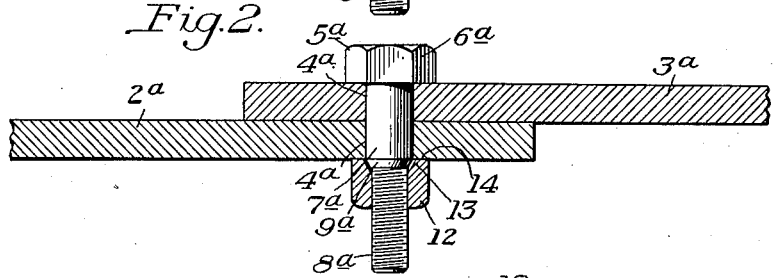
Figure 2 is a view similar to Figure 1 illustrating the use of a recessed nut in place of the nut and washer shown in Figure 1.

The construction illustrated in Figure 2 is similar to that shown in Figure 1, except that a recessed nut 12 is used in place of the nut 10 and washer 11 shown in Figure 1. Parts corresponding to those shown in Figure 1 have been indicated by the same reference numerals with the letter $a$ suffixed. The nut 12 is recessed as indicated by the reference numeral 13 so as to receive the tapered portion $9a$ of the bolt and provide a contact surface 14 for the nut which bears against the plate $2a$ instead of against a washer as shown in Figure 1, so that when the nut is turned on the bolt, it draws the bolt into position so as to cause the swelled shank portion to completely fill the bolt hole.

Figure 3:
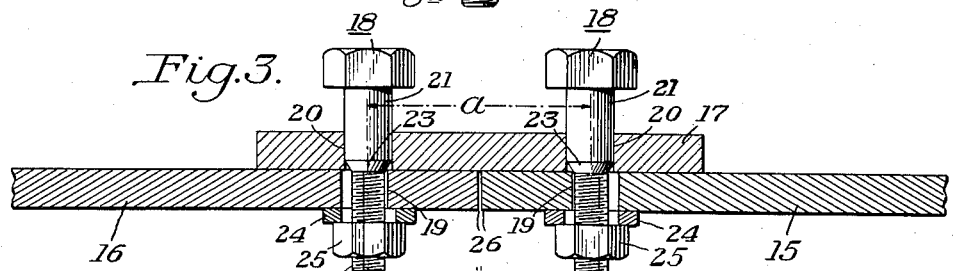
Figures 3 and 4 are sections through a butt joint or splice, Figure 3 illustrating the parts in position before the bolts have been drawn into the bolt holes to complete the joint, and Figure 4 illustrating the completed joint.
Figure 4:
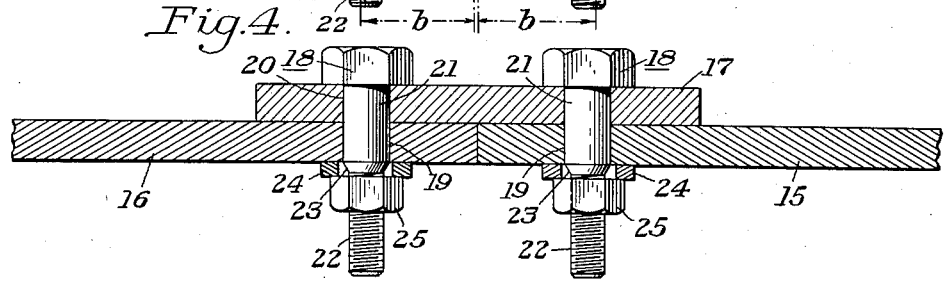

In Figures 3 and 4 there is shown a butt joint or splice in which the ends of abutting plates 15 and 16 are placed under compression in the finished joint so as to avoid any looseness in the joint when water is turned into the conduit. The plates 15 and 16 are joined together by a splice plate 17 and bolts indicated generally by the reference numeral 18. Each of the abutting plates 15 and 16 is provided with a bolt hole 19. The splice plate 17 is provided with two bolt holes 20 which are spaced apart a slightly less distance than the distance between corresponding holes 19 in the abutting plates 15 and 16. In Figure 3, $a$ represents the distance between the centers of the bolt holes 20, and b represents the distance between the end of the plate 16 and the center of the bolt hole 19 in the plate 16. The corresponding distance in plate 15 is also designated by the reference letter b. The spacing of the holes 20 in the splice plate 17 is such that the distance a is slightly less than twice the distance b.

Each of the bolts 18 has a swelled shank portion 21 and a reduced threaded portion 22 connected by a tapered portion 23. A washer 24 and nut 25 are provided for drawing each of the bolts into place. With the parts as illustrated in Figure 3, the nuts 25 are turned so as to draw the swelled shank portions of the bolts into the bolt holes, thereby causing alinement of the holes 20 with the holes 19 and forcing the ends 26 of the plates into tight engagement with each other. The ends of the abutting plates 15 and 16 are placed under compression and the splice plate 17 is placed under initial tension as the bolts are drawn into position in the bolt holes. This prevents any looseness in the joints as the water is turned into the conduit.

Figure 5:
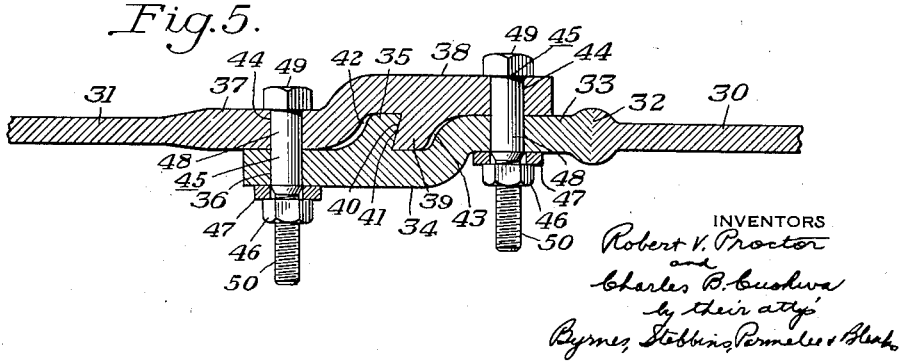
Figure 5 is a section through another type of joint.

Referring to the embodiment shown in Figure 5, the plates which are to be joined are indicated by the reference numerals 30 and 31. Welded to the plate 30, as indicated by the reference numeral 32, is a bar 33 which is thicker than the plate 30. A portion 34 of the bar is offset with respect to the plate 30. That is, the portion 34 and the plate 30 lie in different planes. The bar 33 is provided with an upwardly extending projection 35 and with bolt holes 36. The end 37 of the plate 31 is thickened so that it has a greater thickness than the plate and has a portion 38 which is offset with respect to the plate. A projection 39 on the thickened end 38 extends downwardly and engages the projection 35 along a line 40. The center 41 of line 40 lies in the plane extending through the centers of the plates 30 and 31. The projection 35 is received in a recess 42 formed by the offset portion 38, and the projection 39 is received in a recess 43 formed by the offset portion 34. The thickened end 37 of the plate 31 is provided with bolt holes 44 spaced to correspond with the holes 36. Bolts, indicated generally by the reference numeral 45, are inserted into the bolt holes 44 and 36 and are secured in position by nuts 46 and washers 47. Each of the bolts has a swelled shank portion 48 adjacent the head 49 and a reduced threaded portion 50 at the other end. The increased thickness of the bar 33 or the thickened end 37 of the plate 31 compensates for the loss in section due to the bolt holes.

The bolts are inserted into the bolt holes and the nuts are tightened so as to draw the swelled portions 48 of the bolts into tight engagement with the plates and completely fill the bolt holes. Tightening the bolt causes the projections 35 and 39 to contact with each other so that no further movement of the plates can take place when the conduit is subjected to internal pressure. The center of the engaging surfaces of the projections lies in the plane extending through the centers of the liner plates, thereby eliminating any moment couple which would tend to bend the plates. The contact surfaces of the projections preferably form a reentrant angle which extends at an angle of about 5° to the plates. The function of the projections is to take up the tension, the bolts being used to hold the parts together and to bring the projections into contact with each other. Since only a relative small proportion of the tension in the joint is transmitted through the bolts, the number of bolts and bolt holes may be decreased over what would be necessary if the projections were not used.

In Figure 5 we have shown a plate 30 with a thickened bar welded thereto, and a plate 31 with a thickened end. The plates 30 and 31 may each be provided with thickened ends or with bars of greater thickness than the plates welded to the plates.

A recessed nut as shown in Figure 2, may be used in any of the joints instead of the nuts and washers shown.

The joints of the present invention, wherein bolts with swelled shanks which completely fill the bolt holes are employed, insures that any looseness will be taken up in the construction of the joint so that thereafter when water is turned into the completed structure, there will be no looseness to be taken up which might cause cracking of the cement lining of the conduit and leakage of the water.

We have illustrated and described several types of joints. It is to be understood, however, that the invention may be otherwise embodied within the scope of the following claims.

We claim:

1. A joint comprising abutting plates, a splice plate overlapping the joint between said plates, bolt holes in said abutting plates and said splice plate, the holes in said splice plate being initially spaced at a less distance than the distance between corresponding holes in said abutting plates, bolts in the holes, each of said bolts having a swelled shank portion and a reduced threaded portion, the swelled shank portions completely filling the holes, said splice plate being under initial tension, and means for securing the bolts in place.

2. A joint comprising abutting plates, a splice plate overlapping the joint between said plates, bolt holes in said abutting plates and said splice plate, the holes in said splice plate being initially spaced at a less distance than the distance between corresponding holes in said abutting plates, bolts in the holes, each of said bolts having a swelled shank portion and a reduced threaded portion, the swelled shank portions completely filling the holes, said splice plate being under initial tension, said reduced portion being longer than the combined thickness of the plates so that a nut may be screwed thereon when only the reduced portion of the bolt is in the holes, and a nut for drawing the swelled portion of the shank into tight engagement with the plates.

ROBERT V. PROCTOR.
CHARLES B. CUSHWA.